United States Patent
Smith

(10) Patent No.: US 7,844,478 B1
(45) Date of Patent: Nov. 30, 2010

(54) SYSTEMS AND METHODS FOR IMPLEMENTING REAL ESTATE VALUE INSURANCE

(75) Inventor: Arthur Quentin Smith, Fredericksburg, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 12/192,396

(22) Filed: Aug. 15, 2008

(51) Int. Cl.
*G06Q 40/00* (2006.01)

(52) U.S. Cl. ............................ 705/4; 705/35; 705/38; 705/10; 705/43

(58) Field of Classification Search ............ 705/35, 705/43, 4, 400
See application file for complete search history.

(56) References Cited

U.S. PATENT DOCUMENTS

| | | | |
|---|---|---|---|
| 5,361,201 A | 11/1994 | Jost et al. | |
| 6,178,406 B1 | 1/2001 | Cheetham et al. | |
| 6,678,685 B2 | 1/2004 | McGill et al. | |
| 6,748,369 B2 | 6/2004 | Khedkar et al. | |
| 6,829,584 B2 | 12/2004 | Loveland | |
| 6,842,738 B1 | 1/2005 | Bradley et al. | |
| 6,988,090 B2 | 1/2006 | Yaginuma | |
| 7,236,985 B2 | 6/2007 | Brecher | |
| 7,349,860 B1 * | 3/2008 | Wallach et al. | 705/4 |
| 7,580,848 B2 | 8/2009 | Eder | |
| 2003/0018578 A1 | 1/2003 | Schultz | |
| 2003/0023462 A1 * | 1/2003 | Heilizer | 705/4 |
| 2003/0023593 A1 | 1/2003 | Schmidt | |
| 2003/0088444 A1 * | 5/2003 | Garbin et al. | 705/4 |
| 2003/0110122 A1 * | 6/2003 | Nalebuff et al. | 705/38 |
| 2004/0019517 A1 * | 1/2004 | Sennott | 705/10 |
| 2004/0064392 A1 * | 4/2004 | Barkman, Jr. | 705/36 |
| 2004/0153352 A1 | 8/2004 | Berns et al. | |
| 2004/0260578 A1 * | 12/2004 | Jin | 705/4 |
| 2005/0086179 A1 * | 4/2005 | Mehmet | 705/80 |
| 2005/0187851 A1 | 8/2005 | Sant | |
| 2006/0059020 A1 | 3/2006 | Davidson | |
| 2006/0074794 A1 | 4/2006 | Nespola | |
| 2006/0080228 A1 | 4/2006 | McGill et al. | |
| 2007/0011021 A1 * | 1/2007 | Worstell et al. | 705/1 |

(Continued)

OTHER PUBLICATIONS

Offices of the Insurance Commissioner, A Financial Analysis of Homeowners Insurance, Jul. 2004, p. 6 (WVHOwners).*

(Continued)

*Primary Examiner*—Ella Colbert
*Assistant Examiner*—Chika Ojiaku
(74) *Attorney, Agent, or Firm*—Townsend and Townsend and Crew LLP

(57) ABSTRACT

To protect a person with a property interest in real property against a loss of market value thereof, a base market value of the real property is determined at a current time when the property interest in the real property arises or thereafter, and a number of types of events that cause the real property to lose market value as compared with the base market value are defined. A number of the defined types of events are selected, and a real estate market value policy is issued to the person at about the current time. The policy promises to compensate the person for any loss experienced by the person if the real property loses market value as compared with the base market value based on any of the selected types of events.

18 Claims, 5 Drawing Sheets

U.S. PATENT DOCUMENTS

| | | |
|---|---|---|
| 2007/0136109 A1* | 6/2007 | Yager et al. .................. 705/4 |
| 2007/0250353 A1 | 10/2007 | Schwartz et al. |
| 2007/0260535 A1 | 11/2007 | Kontogiannis |
| 2007/0271163 A1 | 11/2007 | Schaufenbuel |
| 2007/0282737 A1* | 12/2007 | Brasch .................. 705/38 |
| 2007/0294611 A1 | 12/2007 | McKinney et al. |
| 2008/0033847 A1 | 2/2008 | McIntosh |
| 2008/0215479 A1* | 9/2008 | Pollock et al. ............. 705/38 |
| 2009/0018970 A1* | 1/2009 | Barkman, Jr. ............ 705/36 R |
| 2009/0024420 A1 | 1/2009 | Winkler |
| 2009/0222320 A1 | 9/2009 | Arfin et al. |
| 2009/0281842 A1* | 11/2009 | Hendrix .................. 705/4 |

OTHER PUBLICATIONS

Dan Atkinson, Car Insurers hit by ringing fraud, The Guardian (London), Aug. 9, 1990 ( Ringers).*

Russell, T. et al. "Catastrophe Insurance, Dynamic Premium Strategies, and the Market for Capital", Paper prepared for 1995 NAIC/ARIA Symposium Issues in Insurance Regulation. Published in Alternative Approaches to Insurance Regulation, National Association of Insurance Commissioners, 1998.

"Residual Value Insurance for Commercial Shipping Vessels," Jul. 31, 2004; retrieved from the Internet: <http://www.londonspecialrisks.com/pdfs/Ship%2ORVI.pdf>, 3 pages total.

Van Der Hoeven, "After the Storm: What is a tree worth?", North Carolina Cooperative Extension Service, North Carolina State University, Jan. 31, 2001; retrieved from the Internet: <http://www.ag-econ.ncsu.edu/faculty/vanderhoeven/TREELOSS.PDF>, 4 pages total.

State of West Virginia Offices of Insurance Commissioner, "A Financial Analysis of Homeowners Insurance,", Jul. 2004, 29 pages total.

Rohner et al., "TILA 'Finance' and 'Other' Charges in Open-End Credit: The Cost-of-Credit Principle Applied to Charges for Optional Products or Services," 17 Loyola Consumer Law Review, Rev. 137-207, 2005, pp. 1-47.

* cited by examiner

| MATRIX BASE MARKET VALUE = 100K | | | | | | |
|---|---|---|---|---|---|---|
| TYPE OF EVENT | PROB. | LOSS IMPACT | COVER? | MIN LOSS | MAX LOSS | PROB. LOSS |
| RECESSION | .2 | .05 - .2 | N | | | |
| REAL ESTATE CRASH | .2 | .1 - .3 | N | | | |
| FIRE DAMAGE | .02 | .2 - .5 | Y | 20K | 50K | 1K |
| FLOOD DAMAGE | .01 | .2 - .5 | Y | 20K | 50K | .5K |
| WIND DAMAGE | .01 | .2 - .5 | Y | 20K | 50K | .5K |
| LAND DEFORMATION | .05 | .1 - 1 | Y | 10K | 100K | 5K |
| CHEMICAL DAMAGE | .02 | .5 - 1 | N | | | |
| DROUGHT | .3 | .05 - .1 | N | | | |
| REGULATORY CHANGES | .2 | .1 - .5 | N | | | |
| | | | | | | 7K |

Fig. 5

SYSTEMS AND METHODS FOR IMPLEMENTING REAL ESTATE VALUE INSURANCE

CROSS-REFERENCE TO RELATED APPLICATION(S)

The present application is filed concurrently with and shares a common title and disclosure with the following applications, each of which is hereby incorporated herein by reference in its entirety:
U.S. patent application Ser. No. 12/192,424;
U.S. patent application Ser. No. 12/192,441;
U.S. patent application Ser. No. 12/192,460; and
U.S. patent application Ser. No. 12/192,475.

FIELD

The present disclosure is directed to systems and methods that provided an insurance policy that covers a loss in market value associated with real estate.

BACKGROUND

An owner of a piece of real property may purchase property owners insurance to protect against losses associated with the real property, such as for example fire damage, wind damage, water damage, and other damage that may be experienced in connection with the property. Accordingly, if for example a tree is blown down and falls into a structure on the real property, such property owners insurance would typically cover the cost to repair the structure. However, and significantly, the property owners insurance likely does not cover the cost to replace the fallen tree with a similar tree, even if the fallen tree represented an amount of value to the real property that has been lost.

More generally, property owners insurance typically covers losses to structures on real property and related improvements (i.e., fences, pipes, light posts, patios, walkways, etc.), but does not cover losses to natural features on real property (i.e., trees, rock formations, ponds, shrubs, etc.). Moreover, and importantly, such property owners insurance does not cover losses that are intangible. That is, if a certain piece of real property includes a pleasant view, such as for example a view of a city skyline, a valley, an ocean, a river, a statue, a park, etc., and the pleasant view is lost because another property owner builds a blocking structure on land thereof, the intangible loss of the view associated with a piece of real property is not covered by a corresponding property insurance policy.

In a similar manner, a property insurance policy does not typically cover a loss associated with a corresponding piece of real property that arises from an objectionable use of adjacent property, such as for example a neighboring property that is not well-maintained, that emits an objectionable odor, or that is employed for illicit purposes. Moreover, a property insurance policy does not typically cover a loss associated with a corresponding piece of real property that arises from overall market conditions, such as for example an overall drop in real estate value due to market conditions, not to mention a loss that arises from specific factors associated with the real property that are beyond the control of the owner of the real property, such as for example if a toxic chemical is spilled on the property and is not easily remediated.

Real property normally increases in value over time due to market conditions based on factors such as a finite amount of land, inflation, and regional real estate development. However, the value of real property can nevertheless decrease due to adverse market conditions as well as losses in connection with the real property that are perceived to be adverse to the overall desirability of the real property. Particularly with regard to adverse market conditions, and as is set forth in U.S. Pat. Pub. No. 2004/0260578, there are a variety of political, social and economic events that can cause fluctuations resulting in suppressed real estate values lasting for varying periods of time. Some fluctuations can be caused by an industry wide recession such as experienced in the oil and gas sectors in the 1980s, or the downturn in certain high technology sectors at the beginning of the twenty-first century. Global economic shifts, such as the increased production of high quality low cost steel in the Pacific Rim can cause economic displacement in regions with economies fueled by steel production. Sometimes, such downturns can be permanent.

An owner of real property ought not to be concerned with a loss in the market value of the real property for whatever reason, unless of course such loss impinges financially on the owner, such as for example if the owner wishes to sell the property or pledge the property as collateral, which of course is a rather large exception. Nevertheless, in many cases, if such an owner can wait, the market value lost is regained. Sometimes, however, the loss of market value is permanent, such as for example if not caused by overall market conditions, or the loss of market value does indeed impinge financially on the owner because the owner desires to sell or pledge the real property. In a particularly unwanted scenario, the owner is forced to sell the real property at a loss for whatever reason, and the sale value exceeds debt such as a mortgage that must be repaid at such sale, in which case the owner may be required to contribute additional capital at the sale to repay the debt.

Accordingly, a need exists for an insurance policy that covers at least some losses to real estate market value associated with a piece of real property.

SUMMARY

The aforementioned needs are satisfied at least in part by a method and mechanism that protect a person with a property interest in a piece of real property against a loss of market value of the real property during ownership of the property interest. A base market value of the real property is determined at a current time when the property interest in the real property arises or thereafter, and a number of types of events that cause the real property to lose market value as compared with the base market value are defined. A number of the defined types of events are selected, and a real estate market value policy is issued to the person at about the current time. The policy promises to compensate the person for any loss experienced by the person if the real property loses market value as compared with the base market value based on any of the selected types of events.

To issue the policy, a number of types of events that may cause a loss in the market value of the property are identified, a probability of each type of event occurring during the term of the policy is estimated, and an impact of each type of event on the market value of the property is also estimated. Based on the estimated probability and impact of each type of event, it is determined whether each type of event is to be covered by the policy. Thereafter, a probable loss is defined for each covered type of event, the defined probable losses for all of the covered types of events are summed to arrive at an expected cost of claims for the policy, and a premium to be paid for the policy is derived based on the expected cost of claims. The real estate market value insurance policy is then issued to the person in return for the derived premium.

The real estate value insurance policy as issued need not require that a sale of the real property occur in order to calculate a loss. Instead, in at least some instances the loss may be defined prior to such sale. Also, the real estate value insurance policy may allow for remediation of a loss rather than monetary compensation. Additionally, the real estate value insurance policy may exclude losses for which the property owner is responsible, such as for example losses that occur by the owner's act or lack of action, or losses that the owner should have foreseen, among other things.

BRIEF DESCRIPTION OF THE DRAWINGS

The foregoing summary, as well as the following detailed description of various embodiments of the present innovation, will be better understood when read in conjunction with the appended drawings. For the purpose of illustrating the embodiments, there are shown in the drawings embodiments which are presently envisioned. As should be understood, however, the embodiments of the present innovation are not limited to the precise arrangements and instrumentalities shown. In the drawings:

FIG. 5 is a chart showing a risk matrix as may be constructed by the issuer in the course of issuing the policy of FIG. 2 in accordance with various embodiments of the present innovation.

DETAILED DESCRIPTION

Example Computing Environment

Figure 1:
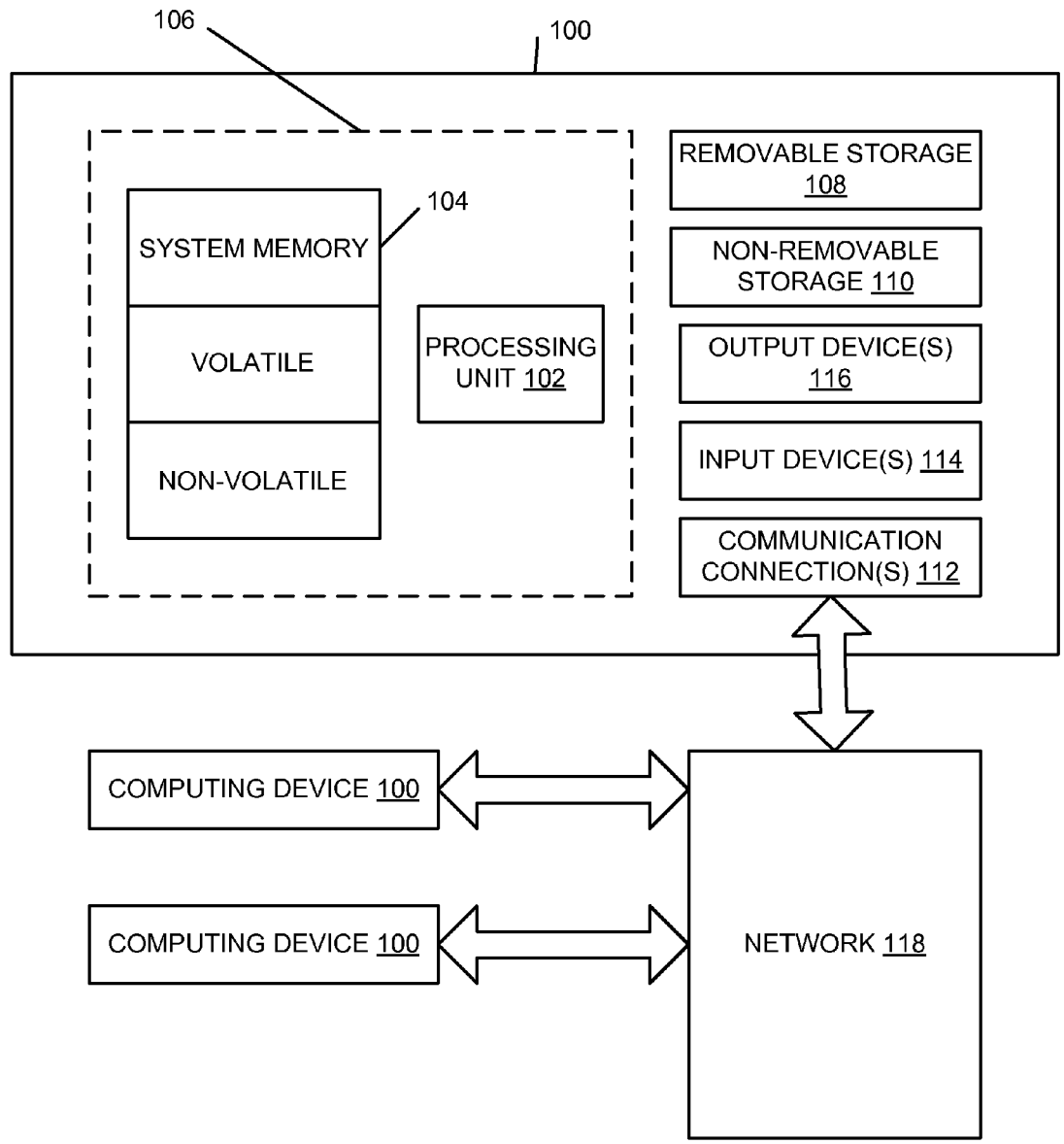
FIG. 1 is a block diagram of an example of a computing environment within which various embodiments of the present innovation may be implemented.

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Real Property Market Value Insurance Policy

Figure 2:
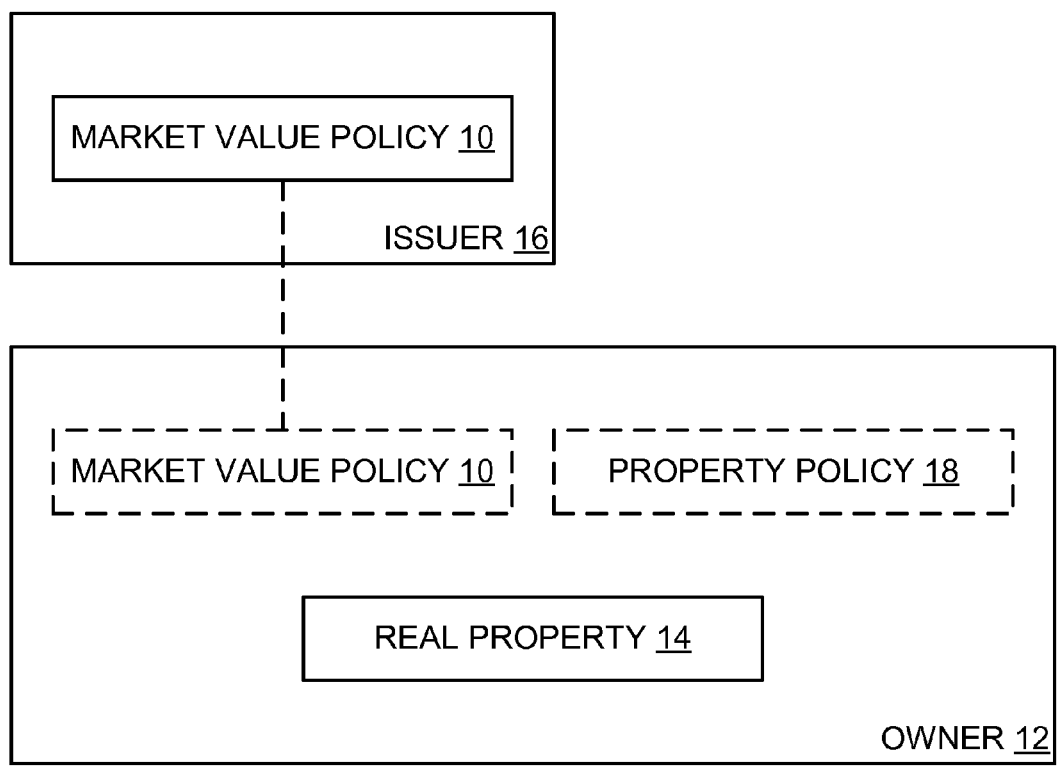
FIG. 2 is a block diagram of a system including a real estate value insurance policy to an owner of real property in accordance with various embodiments of the present innovation.

In various embodiments of the present innovation, and turning now to FIG. 2, a real property market value insurance policy 10 is provided to cover a loss experienced by an owner 12 of a piece of real property 14 when the real property 14 loses market value, either due to overall market conditions or due to a specific event in connection with the real property 14 and as defined by the policy 10. The policy 10 may be purchased either when the owner 12 purchases the real property or after such purchase. The policy provides that if the owner experiences a loss in the value of the real property as defined by the policy, the issuer 16 of the policy, which is presumably an insurance company, will pay out an amount as defined by the policy to the owner or an assignee thereof.

As should be understood, the real property 14 may be most any real property, including land, land with improvements thereon such as for example a house, improvements without attached land, such as for example a condominium apartment or a co-operative apartment among other things, improvements in non-traditional forms, such as for example time-shared property, and the like. Moreover, the real property 14 may be residential property, commercial property, property held in trust, etc. Note that the owner 12 of the real property 14 insured by the market value insurance policy 10 likely already has a more traditional property insurance policy 18 on the property 14. Accordingly, it should be understood that the policy 10 of the present innovation is in addition to such more traditional property insurance policy 18 and is intended to cover market value losses that are not already covered by such more traditional property insurance policy 18.

The market value of the real property 14 should be understood to be the value of the property 14 such as may be obtained by the owner 12 if sold to a willing buyer in an arm's length transaction. Thus, the market value of the property 14 should be valued according to an appraisal of such property 14 as may be performed by the average competent appraiser. Note here that the market value is not necessarily represented by a purchase price paid by the owner 12, for the reason that the owner 12 may have paid too much or too little, and at any rate the purchase price may have been affected by unusual circumstances particular to the owner 12 and the seller that sold the property 14 to the owner 12.

The market value policy 10 as purchased by the owner 12 as was set forth above intended to cover losses not covered by the traditional policy 18, although some overlap between the policies 10, 18 may nevertheless occur. Accordingly, if as was set forth above a tree is blown down and falls into a structure on the real property 14, the property insurance policy 18 would typically cover the cost to repair the structure, and the market value policy 10 would cover the cost to replace the fallen tree with a similar tree, especially inasmuch as the fallen tree represents a loss of value to the real property 14.

More generally, the property insurance policy 18 would typically cover losses to structures on real property 14 and related improvements. In contrast, the market value policy 10 would cover at least some losses to natural features on real property 14 such as trees, rock formations, ponds, shrubs, etc., as well as at least some losses that are intangible, such as the loss of a pleasant view, the loss of quiet surroundings, the loss of a pleasant environment without objectionable odors, sounds, sights, activities, etc. Significantly, the market value policy 10 may cover losses to market value from external forces that are both intangible and not arising from adjacent neighbors, including losses of market value from overall market conditions such as a real estate bust, overall financial conditions such as a recession, toxic chemical spills, and the like.

The loss of market value covered by the policy 10 may be any appropriate loss of market value. For example, the loss may be defined as a devaluation of the real property 14, such as may occur during a downturn in real estate values in general or otherwise. Alternately or in addition, the loss may be defined as a devaluation arising from a specific action, such as for example the loss of a view, the commencement of an objectionable activity on adjacent property, the loss of a natural feature on the property such as a tree that was considered to add value to the real property 14, etc.

Notably, the loss may be defined by the policy 10 to arise when the owner 12 suffers the devaluation and before the owner 12 sells the property 14 at a loss, when the owner 12 sells the property 14 at a loss, when the owner appraises the property 14, perhaps in connection with pledging same as collateral, or when the owner attempts to sell the property 14 and cannot do so for lack of a buyer, among other things. Notably, inasmuch as the property 14 may regain value that would accrue to the owner 12 if the loss is paid before the property 14 is sold, care should be taken not to reward the owner 12 for a temporary loss that could later be followed by a gain. For example, the insurance policy 10 may require that payment on a claim for a loss incurs a lien on the property 14 so as to offset the payment with any future gain when the property 14 is sold.

The amount of the loss may be defined by the policy 10 in any appropriate manner. For example, the loss may defined based on the purchase price paid by the owner 12 for the property 14 or an appraisal of the property 14 when the policy 10 is issued, and an appraisal of the property 14 at the time the loss arises. Further, the amount of the loss may be subject to a deductible amount that is either a fixed value or a percentage of the amount of the loss, and may be limited to a minimum and/or maximum value before or after any deductible is applied. Further, the loss may be limited to a particular time frame, such as for example only between five and ten years after the policy 10 is issued, and perhaps only if the policy 10 remains in force when the loss arises.

Notably, if the owner 12 of an insured piece of property 14 makes a claim for a loss that arises in connection therewith, the claim once approved can be paid based on a calculated value of the loss of market value and after taking into consideration any deductibles of other loss limitations. Alternately, and if advisable, the issuer 16 may decide to take a remediating action that would restore the market value or a portion thereof so as to mitigate such payment on the claim. For example, if a loss of 40,000 USD is claimed based on the destruction of a tree on the real property 14 but the cost to restore the property 14 by replacing the tree is 20,000 USD, the issuer 16 would likely choose replacing the tree rather than paying out the 40,000 USD claim.

Note here that if remediation restores only a portion of market value lost, the remaining portion likely is compensated on a cash basis. Note too that the decision on whether to remediate at least a portion of a loss should take into account not only the current cost to remediate but also possible future costs. For example, replacing the tree may cost the 20,000 USD set forth above, but it may also be likely that the replacement tree could also be destroyed, in which case the cost could be another 20,000 USD or a decision to pay the entire 40,000 USD. Thus, paying 20,000 USD to remediate could save 20,000 USD or could lead to paying a total of 40,000 USD or even 60,000 USD or more.

Presumably, the policy 10 as issued includes terms to guard against any fraud that the owner 12 may attempt to perpetrate. For example, to guard against an artificial loss, such as for example may be achieved by selling the property 14 at an artificially low price, the policy 10 may require that each loss be proved by an appraisal of the property 14 at the time the loss arises, and that the issuer 16 can challenge such appraisal as appropriate. More generally, to guard against any fraud, the policy 10 may exclude certain losses, such as for example losses that occur by the unreasonable action or inaction of the owner 12, losses that the owner 12 could reasonably have prevented, losses due to negligence or incompetence on the part of the owner 12, and the like.

The policy 10 may be established by the owner 12 when the owner 12 either purchases the property 14 or pledges same as collateral, or at any other time. In any case, the property 14 should be appraised to ascertain the value thereof for purposes of defining any future loss. The policy 10 as purchased may specify a one-time paid up premium or recurring premiums, and may specify that the loss must occur while the policy 10 is in force. As was alluded to above, the issuer 16 of the policy 10 is typically an insurance company but can be another type of company or even an individual.

Figure 3:
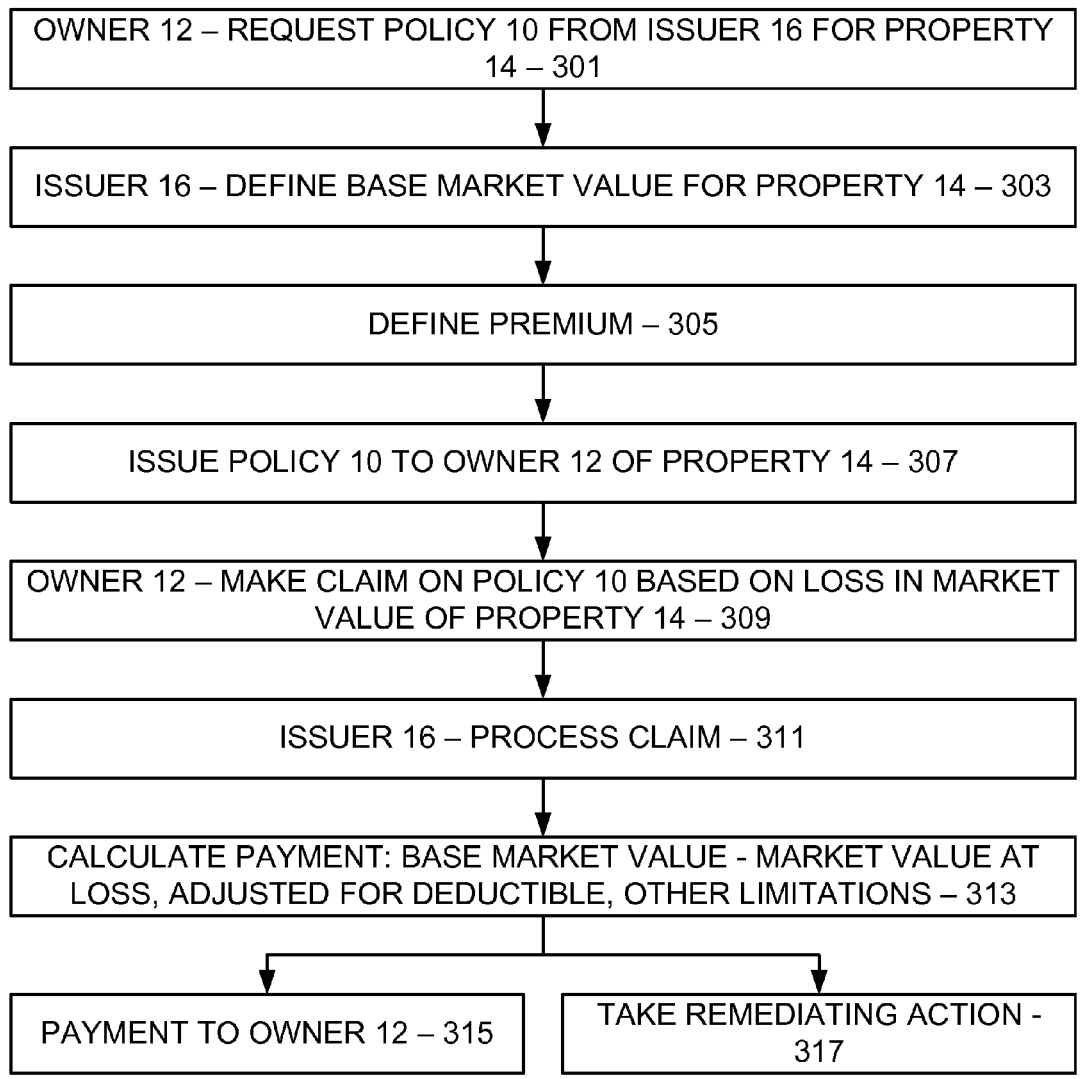
FIG. 3 is a flow diagram showing actions performed in the connection with the policy of FIG. 2 in accordance with various embodiments of the present innovation.

Turning now to FIG. 3, it is seen that an owner 12 wishes to purchase a real property market value insurance policy 10 from an issuer 16 with regard to a piece of real property 14. Accordingly, the owner 12 requests such a policy 10 from the issuer 16 (301). In response, the issuer 16 defines a base market value for the property 14 (303), either as a purchase price if the owner 12 is purchasing the property 14 or has recently purchased the property 14, or as an appraised value of the property 14 as provided by an appraiser, defined a premium (305), and issues the policy 10 to the owner 12 of the property 14 (307).

In one example, the policy 10 is issued for a predetermined period such as a year, during which the terms of the policy 10 including a premium paid and a base market value for the property 14 remain constant. The policy 10 can then be renewed for a like period, although perhaps with a different premium and/or other terms. Notably, the base market value of the property 14 as set forth in connection with the renewed policy 10 may be adjusted or may remain constant. If adjusted, such adjustment may be based on a new appraisal or on a defined mathematical formula.

As is usual, the premium established with regard to the policy 10 is based on a calculation of the risk of loss that is incurred in connection with the policy 10. Thus, the premium is established from a variety of factors, including but not limited to the base market value, market volatility at the time the policy 10 is established, the location of the real property 14, and particularly compiled statistics regarding types of potential losses that may result in a claim under the policy and average amounts thereof. Such statistics are generally known or should be apparent to the relevant public and therefore need not be set forth herein in any detail other than that which is provided. Notably, such statistics should take the location of the real property 14 into account, especially inasmuch as the market value for any piece of property 14 is often highly dependent on the location thereof.

Returning to FIG. 3, it is seen that the owner 12 makes a claim on the policy 10 based on having suffered a loss in the market value of the property 14 as a result of some loss event (309). For example, the loss event may be the sale of the property 14 at a loss, or else a loss as defined by the policy 10 that occurs prior to such a sale. In response, the issuer 16 processes the claim (311) by determining among other things that the loss is covered by the policy 10, a market value for the property 14 such as may be obtained from an appraisal, and that the loss is not fraudulent or otherwise the fault of the owner 12.

Presuming that the claim is approved, the amount to be paid is calculated based on the difference between the base market value for the property 14 as set forth in the policy 10 and the market value when the loss arose, and also based on any deductible or other limitations on the loss as set forth in the policy 10 (313). Thereafter, the amount of the loss as adjusted by any deductibles or limitations is paid to the owner 12 (315), or else the issuer takes an appropriate remediating action if available, advisable, and capable of remediating the loss as experienced by the owner 12 (317).

Figure 4:
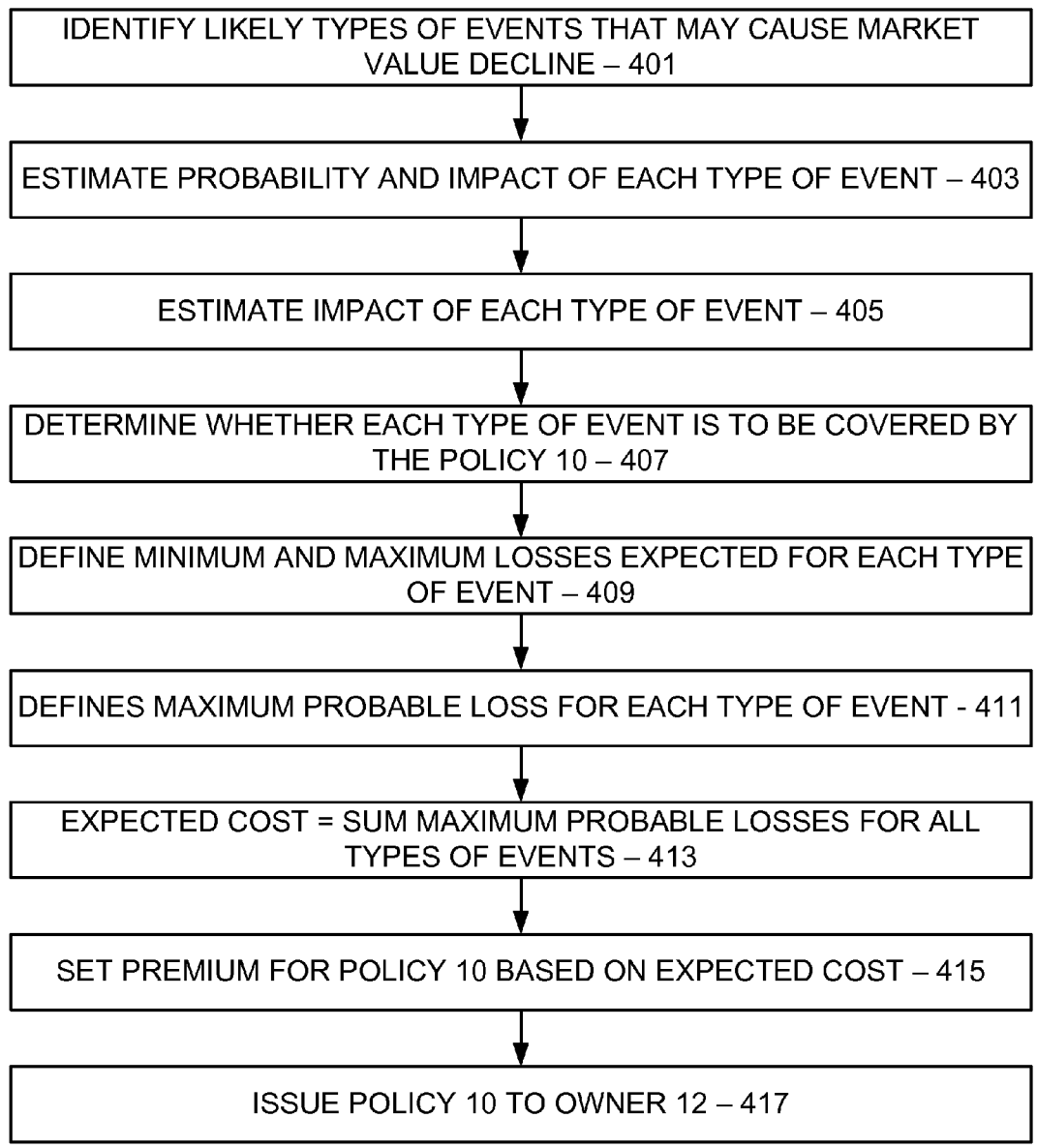
FIG. 4 is a flow diagram showing actions performed in the course of the issuer issuing the policy of FIG. 2 in accordance with various embodiments of the present innovation.

Turning now to FIG. 4, it is seen that from the point of view of the issuer 16, providing the policy 10 to the owner 12 with regard to a piece of real property 14 thereof is performed generally in the following manner. Preliminarily, the issuer upon being requested to issue the policy 10 as at 301 performs an assessment regarding the risks incurred by issuing a policy 10 to the owner 12 covering the real property 14. In such a assessment, and referring also to FIG. 5, the issuer 16 identifies a number of likely types of events that may cause a loss in the market value of the property 14 (first column in FIG. 5) (401 in FIG. 4), estimates a probability of each type of event occurring during the term of the policy 10 and also the impact of each type of event on the base market value of the property 14 (second and third columns) (403, 405), and based on the estimated probability and impact of each type of event determines whether each type of event is to be covered by the policy 10 (fourth column) (407). Also, the issuer 16 may in addition to deciding to cover a particular type of risk may decide on appropriate exclusions, pre-existing conditions, and other limitations that are to be included in the policy 10.

Generally, although by no means exclusively, the issuer 16 would not cover a type of event that has too high a probability or that has too high an impact, or any type of event for which the risk is not well-understood for effective pricing. For example, and as shown in FIG. 5, the issuer 16 has decided to cover losses due to fire, flood, wind, and land deformation (mudslide, e.g.) damage, each of which has a relatively low probability of occurrence, but has decided to forego covering recession, a local real estate crash, chemical damage, drought, and environmental regulatory changes. With regard to all but chemical damage, and as can be seen, the probability of loss is relatively high, and therefore the risk is to be avoided by the issuer. In contrast, the probability of loss for chemical damage is relatively low but the loss impact is high, and therefore also to be avoided by the issuer 16.

In any event, for each type of event to be covered, the issuer 16 then defines minimum and maximum losses expected from such an event occurring (fifth and sixth columns) (409), as the base market value for the property 14 defined as at 303 multiplied by a range of the impact of the loss from the third column. Based thereon, the issuer 16 then defines a maximum probable loss for each type of event as the maximum loss expected (sixth column) (411) multiplied by the probability of the event occurring (second column). The maximum probable losses for all types of events covered are then summed to arrive at an expected cost to the issuer 16 in connection with issuing the policy 10 (413).

Thereafter, the issuer may set the premium for the policy 10 based on the expected cost as well as other factors (415). Such other factors are generally known or apparent to the relevant public and therefore need not be set forth herein in any detail other than that which is provided. Generally, in addition to the expected cost, the premium is based on an administrative cost to underwrite, quote, fulfill, and otherwise service the policy 10, a profit margin, and perhaps an adjustment as may be necessary or desirable to be competitive with other issuers 16. Of course, assuming the policy 10 is acceptable to the owner 12, the issuer 16 issues the policy 10 thereto in return for payment of the premium set as at 415 (417).

Of course, the issuer must also service the policy 10 by billing for premiums, collecting the billed premiums and investing the proceeds as may be deemed advisable, processing claims, handling renewals, handling appraisals, and other typical insurance functions. Such functions as should be understood are generally known or should be apparent to the relevant public and therefore need not be set forth herein in any detail. Accordingly, such insurance functions may be performed in any appropriate manner without departing from the spirit and scope of the present innovation.

CONCLUSION

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, systems and methods provide a market value insurance policy 10 that covers at least some losses incurred by an owner 12 due to real estate market value associated with a piece of real property 14. The policy 10 covers at least some losses prior to the owner 12 of the real property 14 selling same. The market value insurance policy 10 is implemented so as to define risks unique to the market value of the real property 14, and to avoid fraud by the owner 12.

It should be appreciated that changes could be made to the embodiments described above without departing from the innovative concepts thereof. For example, although the present innovation is set forth primarily in terms of real property 14 comprising land, such real property need not necessarily include land. Likewise, although the present innovation is set forth primarily in terms of an owner 12 of the real property 14 purchasing the policy 10, another entity may also purchase the property if deemed appropriate, such as for example a tenant of the real property 14, a mortgagee, an agent, etc. It should be understood, therefore, that this innovation is not limited to the particular embodiments disclosed, but it is intended to cover modifications within the spirit and scope of the present innovation as defined by the appended claims.

The invention claimed is:

1. A method of protecting a person with a property interest in a piece of real property against a loss of market value of the real property during ownership of the property interest, the method being performed by a hardware computing device including a processor, a memory, and a communications module, the method comprising:

determining a base market value of the real property at a current time, the current time comprising one of when the property interest in the real property arises and after when the property interest in the real property arises;

defining in the memory of the computing device a number of types of loss events that cause the real property to lose market value as compared with the base market value, each of the number of types of events occurring prior to the person selling the property interest;

storing the defined types of loss events in the memory;

selecting a number of the defined types of loss events for which the person is to be protected;

issuing to the person at about the current time a real estate market value insurance policy, the policy promising to compensate the person for any loss experienced by the person when the real property loses market value as compared with the base market value based on any of the selected types of loss events, the issued policy not requiring the person to sell the property interest to establish the loss;

establishing, using the processor, a premium with regard to the policy based on a calculation of a risk of loss incurred in connection with the policy;

collecting the established premium;

receiving a notification of an occurrence of one of the selected types of loss events;

transmitting information to compensate the person with a payment equal to a value of the one of the selected types of loss events;

thereafter, receiving, using the communications module, a notification of a sale of the property interest;

determining that the property interest has regained at least a portion of the value of the one of the selected types of loss events; and collecting an offset payment from the person to offset the payment.

2. The method of claim 1 wherein the person with the property interest in the piece of real property is an owner of the real property.

3. The method of claim 1 wherein determining the base market value of the real property comprises the market value thereof at the current time such as may be obtained if sold to a willing buyer in an arm's length transaction.

4. The method of claim 1 wherein the real property is selected from land, land with improvements, and improvements without attached land.

5. The method of claim 1 wherein the market value policy covers losses not covered by a property insurance policy.

6. The method of claim 1 further comprising transmitting information to incur a lien on the property interest equal to the payment.

7. A computer-readable storage medium having computer-executable instructions thereon implementing a method of protecting a person with a property interest in a piece of real property against a loss of market value of the real property during ownership of the property interest, the method comprising:

determining a base market value of the real property at a current time, the current time comprising one of when the property interest in the real property arises and after when the property interest in the real property arises;

defining a number of types of loss events that cause the real property to lose market value as compared with the base market value, each of the number of types of loss events occurring prior to the person selling the property interest;

selecting a number of the defined types of loss events for which the person is to be protected;

issuing to the person at about the current time a real estate market value insurance policy, the policy promising to compensate the person for any loss experienced by the person when the real property loses market value as compared with the base market value based on any of the selected types of loss events, the issued policy not requiring the person to sell the property interest to establish the loss;

establishing a premium with regard to the policy based on a calculation of a risk of loss incurred in connection with the policy;

collecting the established premium;

receiving a notification of an occurrence of one of the selected types of loss events;

transmitting information to compensate the person with a payment equal to a value of the one of the selected types of loss events;

thereafter, receiving a notification of a sale of the property interest;

determining that the property interest has regained at least a portion of the value of the one of the selected types of loss events; and collecting an offset payment from the person to offset the payment.

8. The medium of claim 7 wherein the person with the property interest in the piece of real property is an owner of the real property.

9. The medium of claim 7 wherein determining the base market value of the real property comprises the market value thereof at the current time such as may be obtained if sold to a willing buyer in an arm's length transaction.

10. The medium of claim 7 wherein the real property is selected from land, land with improvements, and improvements without attached land.

11. The medium of claim 7 wherein the market value policy covers losses not covered by a property insurance policy.

12. The medium of claim 7 further comprising transmitting information to incur a lien on the property interest equal to the payment.

13. A system that protects a person with a property interest in a piece of real property against a loss of market value of the real property during ownership of the property interest, the system comprising:

a subsystem that determines a base market value of the real property at a current time, the current time comprising one of when the property interest in the real property arises and after when the property interest in the real property arises;

a subsystem that defines a number of types of loss events that cause the real property to lose market value as compared with the base market value, each of the number of types of loss events occurring prior to the person selling the property interest;

a subsystem that selects a number of the defined types of loss events for which the person is to be protected;

a subsystem that issues to the person at about the current time a real estate market value insurance policy, the policy promising to compensate the person for any loss experienced by the person when the real property loses market value as compared with the base market value based on any of the selected types of loss events, the issued policy not requiring the person to sell the property interest to establish the loss;

a subsystem that establishes a premium with regard to the policy based on a calculation of a risk of loss incurred in connection with the policy;

a subsystem that collects the established premium; a subsystem that receives a notification of an occurrence of one of the selected types of loss events;

a subsystem that transmits information to compensate the person with a payment equal to a value of the one of the selected types of loss events; a subsystem that thereafter, receives a notification of a sale of the property interest;

a subsystem that determines that the property interest has regained at least a portion of the value of the one of the selected types of loss events; and a subsystem that collects an offset payment from the person to offset the payment.

14. The system of claim 13 wherein the person with the property interest in the piece of real property is an owner of the real property.

15. The system of claim 13 wherein determining the base market value of the real property comprises the market value thereof at the current time such as may be obtained if sold to a willing buyer in an arm's length transaction.

16. The system of claim 13 wherein the real property is selected from land, land with improvements, and improvements without attached land.

17. The system of claim 13 wherein the market value policy covers losses not covered by a property insurance policy.

18. The system of claim 13 wherein the person is compensated for a loss experienced prior to selling the property interest but is required to offset the compensated loss with any future gain when the property interest is sold further comprising a subsystem to transmit information to incur a lien on the property interest equal to the payment.

* * * * *